(12) United States Patent
Yang

(10) Patent No.: US 11,317,734 B2
(45) Date of Patent: May 3, 2022

(54) HIGHCHAIR

(71) Applicant: ZHONGTONG (XIAMEN) CHILDREN PRODUCTS CO., LTD., Xiamen (CN)

(72) Inventor: Jianbo Yang, Xiamen (CN)

(73) Assignee: ZHONGTONG (XIAMEN) CHILDREN PRODUCTS CO., LTD., Xiamen (CN)

( * ) Notice: Subject to any disclaimer, the term of this patent is extended or adjusted under 35 U.S.C. 154(b) by 15 days.

(21) Appl. No.: 17/107,871

(22) Filed: Nov. 30, 2020

(65) Prior Publication Data
US 2021/0401189 A1  Dec. 30, 2021

(30) Foreign Application Priority Data
Jun. 29, 2020 (CN) .......................... 202021219473.8

(51) Int. Cl.
*A47D 1/10* (2006.01)
*A47D 1/04* (2006.01)
*A47D 1/00* (2006.01)
*A47D 3/00* (2006.01)
*A63H 33/08* (2006.01)

(52) U.S. Cl.
CPC .............. *A47D 1/106* (2013.01); *A47D 1/008* (2013.01); *A47D 3/00* (2013.01); *A63H 33/086* (2013.01)

(58) Field of Classification Search
CPC . A47D 1/002; A47D 1/04; A47D 1/10; A47D 11/002; A47D 11/00
See application file for complete search history.

(56) References Cited

U.S. PATENT DOCUMENTS 11,202,518 B1 * 12/2021 Lo .......................... A47D 11/002
2016/0174727 A1 * 6/2016 Haut ...................... A47D 1/106
297/130
2018/0263379 A1 9/2018 Cheng

FOREIGN PATENT DOCUMENTS

| CN | 111938368 A | * | 11/2020 |
| DE | 202012013265 U1 | | 10/2015 |
| GB | 2476455 A | | 6/2011 |
| WO | 2008044009 A1 | | 4/2008 |

* cited by examiner

*Primary Examiner* — Sarah B Mcpartlin
(74) *Attorney, Agent, or Firm* — Bayramoglu Law Offices LLC

(57) ABSTRACT

A highchair includes a building block table, a booster stool and a feeding chair. The bottom of the booster stool is detachably connected to the top of the building block table. The bottom of the feeding chair is detachably connected to the top of the booster stool. Four sockets are provided on the top surface of the building block table. An elastic cover that is adapted to the socket covers the top of each socket. A plurality of vertical grooves are spaced apart on the inner periphery of each socket. The bottom surface of each socket is provided with a first spring receiving groove. A plurality of protruding blocks are spaced apart on the outer periphery of each cover. The protruding block is matched with a corresponding groove. The bottom surface of each cover is provided with a second spring receiving groove.

4 Claims, 17 Drawing Sheets

HIGHCHAIR

CROSS REFERENCE TO THE RELATED APPLICATIONS

This application is based upon and claims priority to Chinese Patent Application No. 202021219473.8, filed on Jun. 29, 2020, the entire contents of which are incorporated herein by reference.

TECHNICAL FIELD

The present invention relates to the field of children's products, in particular to a highchair.

BACKGROUND

An existing multifunctional highchair includes a building block table, a booster stool and a feeding chair. The bottom of the booster stool is detachably connected to the top of the building block table. The bottom of the feeding chair is detachably connected to the top of the booster stool. The top surface of the building block table is provided with a plurality of protrusions, and the building block table is provided with building blocks connected to the protrusions. Four sockets are provided on the top surface of the building block table. The building block table has four legs, and the four sockets separately extend into the upper parts of the corresponding legs. The booster stool also has four legs, and the bottoms of the four legs of the booster stool are inserted into the corresponding sockets. The building block table is further provided with four covers, each corresponds to a socket, and covers the corresponding socket. The cover is detachably connected to the building block table, and includes a cover body and a bending part integrally formed with the cover body. Four connecting parts are provided on the bottom surface of the building block table. Each cover corresponds to a connecting part. A first screw hole is formed on the bottom of the cover. The bottom surface of the connecting part is provided with a second screw hole extending upward. The bottom of the cover is connected to the connecting part by screwing screws into the first screw hole and the second screw hole.

To improve aesthetics, it is desirable that the cover covers the corresponding socket when the booster stool and the feeding chair are removed. However, in the prior art, the covers are screwed to the building block table, resulting in a complicated connection. Moreover, the installation of the cover depends on whether the booster stool is installed. In other words, the cover needs come off and put back on each time when the building block table is connected to the booster stool or when the booster stool is removed from the building block table, causing inconvenience.

SUMMARY

In order to overcome the above-mentioned problems in the prior art, an objective of the present invention is to provide a highchair.

The present invention is achieved by adopting the following technical solution.

A highchair includes a building block table, a booster stool, and a feeding chair. The bottom of the booster stool is detachably connected to the top of the building block table. The bottom of the feeding chair is detachably connected to the top of the booster stool. Four sockets are provided on the top surface of the building block table. An elastic cover that is adapted to the socket covers the top of each socket. A plurality of vertical grooves are spaced apart on the inner periphery of each socket. The bottom surface of each socket is provided with a first spring receiving groove. A plurality of protruding blocks are spaced apart on the outer periphery of each cover. The protruding block is matched with a corresponding groove. The bottom surface of each cover is provided with a second spring receiving groove. A first spring is provided between the first spring receiving groove and the second spring receiving groove. The building block table has four legs, and the four sockets separately extend into the upper parts of the corresponding legs. The booster stool also has four legs, and the bottoms of the four legs can be inserted into the corresponding sockets.

The leg of the booster stool includes a leg rod and an inserting rod. The top of the inserting rod is inserted into the bottom of the leg rod. An abutting plate is provided in the middle of the inserting rod. The inserting rod has a hollow structure. A limiting member is provided inside the top of the inserting rod. The bottom of the limiting member is provided with an opening. A left elastic piece and a right elastic piece are respectively provided on the left and right sides of the limiting member. The left side surface of the left elastic piece is provided with a left clamping column. The right side surface of the right elastic piece is provided with a right clamping column. The inserting rod is provided with two clamping holes that are respectively engaged with the left clamping column and the right clamping column. A pressing member is provided inside the inserting rod, and the width of the pressing member is equivalent to the width of the opening. The rear side surface of the pressing member is provided with a pressing column and a clamping part arranged from top to bottom. The front side surface of the pressing member is provided with a receiving column. The top surface of the receiving column is provided with a limiting slot. A third spring receiving groove is provided in the receiving column. A limiting part is provided on the top surface of the opening of the limiting member. The limiting part is located in the limiting slot. A second spring is provided between the third spring receiving groove and the inner side wall of the inserting rod. One end of the pressing column passes through the inserting rod and the leg rod in sequence, and is located outside the leg rod. A clamping slot is provided in the socket. The clamping part passes through the inserting rod and is engaged in the clamping slot.

The left and right side surfaces of the booster stool are each provided with a buckle plate. The bottom of the buckle plate is hinged to the booster stool. A buckle groove is provided on the top of the inner side of the buckle plate. A buckle part configured to be buckled into the buckle groove is provided on the bottom of each of the left and right sides of the feeding chair. A pressing part is provided in the middle of each of the front end and the rear end of the booster stool, respectively. The rear end of the pressing part is provided with a left limiting piece and a right limiting piece. Each of the left limiting piece and the right limiting piece is provided with a strip groove. A left positioning column corresponding to the left limiting piece and a right positioning column corresponding to the right limiting piece are provided inside the booster stool. The top of the left positioning column and the top of the right positioning column are respectively located in the corresponding strip grooves. A hook is provided on the top of the pressing part. The rear end of the pressing part is provided with a fourth spring receiving groove. A protruding supporting plate is provided inside the booster stool. The bottom surface of the left limiting piece and the bottom surface of the right limiting piece respectively abut against the two lower top surfaces of the supporting plate. Two limiting plates are provided on the front side surface of the supporting plate. A third spring is provided between the fourth spring receiving groove and the front side surface of the supporting plate. The rear end of the third spring is located between the two limiting plates. A supporting platform for supporting the rear end of the third spring is provided between the two limiting plates. A hook groove snap-fitted with the corresponding hook is provided at the bottom of each of the front end and the rear end of the feeding chair.

A supporting part is provided on the bottom of each of the four legs of the building block table, and the outer periphery of the supporting part gradually increases from top to bottom.

According to the description of the present invention, the present invention has the following advantages compared with the prior art. The present invention has a novel structure and a smart design. When a booster stool is connected to a building block table, the four chair legs correspond to the corresponding sockets, and the covers do not need to be removed. Utilizing the weight of the booster stool or the booster stool and a feeding chair, the four chair legs press down the corresponding covers, and the first springs are compressed. The protruding block and the groove are engaged, so that the cover can ascend and descend smoothly. When the booster stool is removed from the building block table, the cover can ascend and return to an original position under the action of an elastic force of the first spring. In the present invention, the cover can be conveniently connected to the socket, and it does not require to be removed whether the booster stool is connected to the building block table or not.

DETAILED DESCRIPTION

Figure 1:
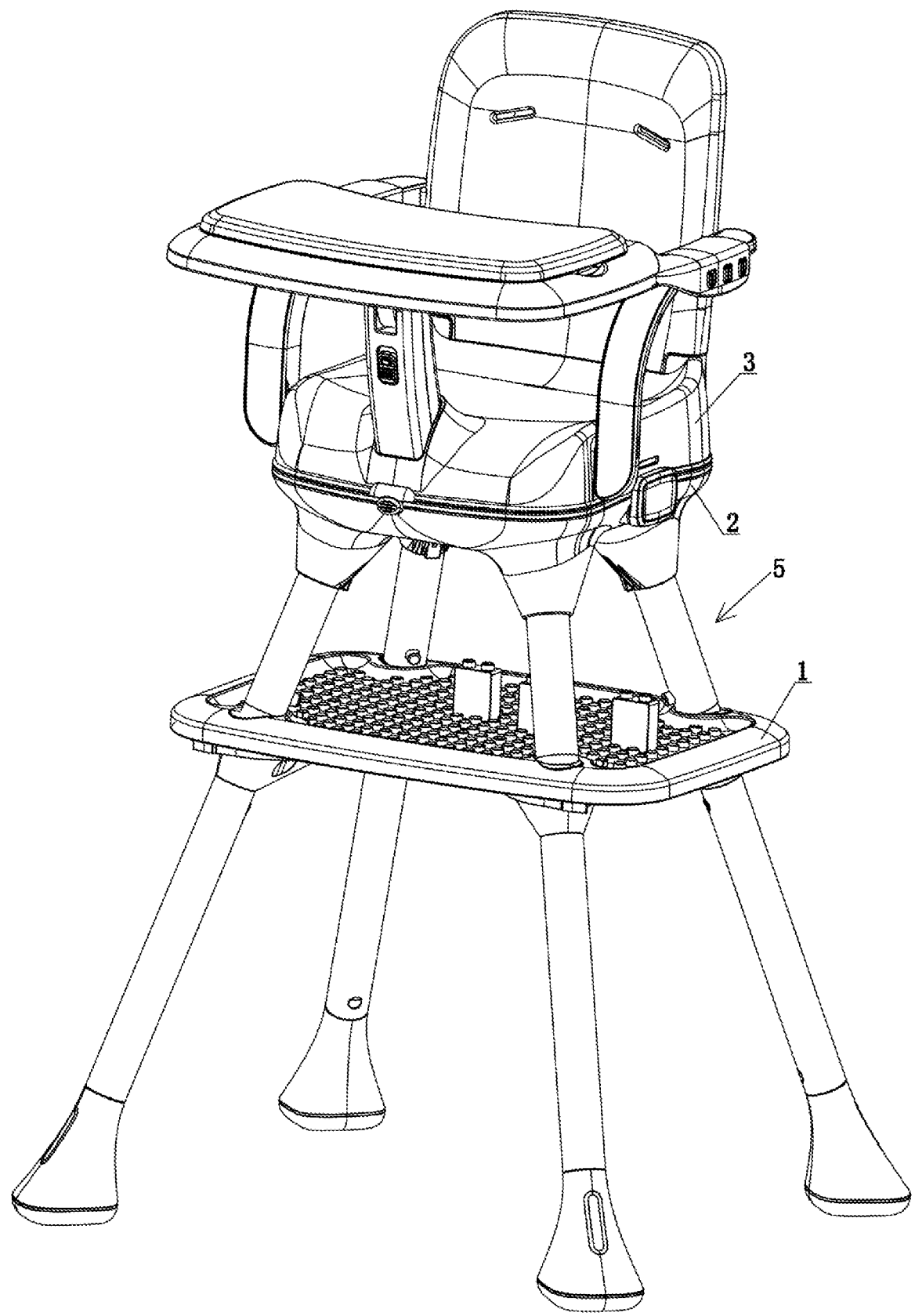
FIG. 1 is a structural diagram of the present invention.

Referring to FIGS. 1-6, a highchair includes the building block table 1, the booster stool 2 and the feeding chair 3. The bottom of the booster stool 2 is detachably connected to the top of the building block table 1. The bottom of the feeding chair 3 is detachably connected to the top of the booster stool 2. Four sockets 11 are provided on the top surface of the building block table 1. The elastic cover 4 that is adapted to the socket 11 covers the top of each socket 11. A plurality of vertical grooves 12 are spaced apart on the inner periphery of each socket 11. The bottom surface of each socket 11 is provided with the first spring receiving groove 13. A plurality of protruding blocks 41 are spaced apart on the outer periphery of each cover 4. Each protruding block 41 is matched with the corresponding groove 12. The bottom surface of each cover 4 is provided with the second spring receiving groove 42. A first spring (not shown) is provided between the first spring receiving groove 13 and the second spring receiving groove 42. The building block table 1 has four legs 14, and the four sockets 11 separately extend into the upper parts of the corresponding legs 14. The booster stool 2 has four legs 5, and the bottoms of the four legs 5 can be inserted into the corresponding sockets 11.

Referring to FIGS. 1-6, when the booster stool 2 is connected to the building block table 1, the four legs 5 correspond to the corresponding sockets 11, and the covers 4 do not need to be removed. Utilizing the weight of the booster stool 2 or the booster stool 2 and the feeding chair 3, the four legs 5 press down the corresponding covers 4, and the first springs (not shown) are compressed. The protruding block 41 is matched with the groove 12, so that the cover 4 can ascend and descend smoothly. When the booster stool 2 is removed from the building block table 1, the cover 4 can ascend and return to the original position under the action of an elastic force of the first spring (not shown).

Referring to FIGS. 1, 7, 8 and 10-13, the leg 5 includes the leg rod 51 and the inserting rod 52. The top of the inserting rod 52 is inserted into the bottom of the leg rod 51. The abutting plate 53 is provided in the middle of the inserting rod 52, and the abutting plate 53 abuts against the top surface of the building block table 1. The inserting rod 52 has a hollow structure. The limiting member 6 is provided inside the top of the inserting rod 52. The bottom of the limiting member 6 is provided with the opening 61. The left elastic piece 62 is provided on the left side of the limiting member 6 and the right elastic piece 63 is provided on the right side of the limiting member 6. The left side surface of the left elastic piece 62 is provided with the left clamping column 64, and the right side surface of the right elastic piece 63 is provided with the right clamping column 65. The inserting rod 52 is provided with two clamping holes 54 that are respectively engaged with the left clamping column 64 and the right clamping column 65. The pressing member 7 is provided inside the inserting rod 52, and the width of the pressing member 7 is equivalent to the width of the opening 61. The rear side surface of the pressing member 7 is provided with the pressing column 71 and the clamping part 72 arranged from top to bottom. The front side surface of the pressing member 7 is provided with the receiving column 73. The top surface of the receiving column 73 is provided with the limiting slot 74. The third spring receiving groove 75 is provided in the receiving column 73. The limiting part 66 is provided on the top surface of the opening of the limiting member 6. The limiting part 66 is located in the limiting slot 74. A second spring (not shown) is provided between the third spring receiving groove 75 and the inner side wall of the inserting rod 52. One end of the pressing column 71 passes through the inserting rod 52 and the leg rod 51 in sequence and is located outside the leg rod 51. The clamping slot 15 is provided in the socket 11. The clamping part 72 passes through the inserting rod 52 and is engaged in the clamping slot 15.

Referring to FIGS. 4, 7, 8 and 10, the legs 5 are detachably connected to the building block table 1. When the inserting rod 52 is inserted into the socket 11, the clamping part 72 is engaged in the clamping slot 15, so that the legs 5 are securely connected to the building block table 1. When the booster stool 2 is removed from the building block table 1, the pressing column 71 is pressed to disengage the clamping part 72 from the clamping slot 15, so that the booster stool can be removed.

Referring to FIGS. 7, 8, 9 and 14-17, the left and right side surfaces of the booster stool 2 are each provided with the buckle plate 21. The bottom of the buckle plate 21 is hinged to the booster stool 2. The buckle groove 22 is provided on the top of the inner side of the buckle plate 21. The buckle part 31 configured to be buckled into the buckle groove 22 is provided on the bottom of each of the left and right sides of the feeding chair 3. The pressing part 8 is provided in the middle of each of the front end and the rear end of the booster stool 2. The rear end of the pressing part 8 is provided with the left limiting piece 81 and the right limiting piece 82. The left limiting piece 81 and the right limiting piece 82 are each provided with the strip groove 83. The left positioning column 23 corresponding to the left limiting piece 81 and the right positioning column 24 corresponding to the right limiting piece 82 are provided inside the booster stool 2. The top of the left positioning column 23 and the top of the right positioning column 24 are respectively located in the corresponding strip grooves 83. The hook 84 is provided on the top of the pressing part 8. The rear end of the pressing part 8 is provided with the fourth spring receiving groove 85. The protruding supporting plate 25 is provided inside the booster stool 2. The bottom surfaces of the left limiting piece 81 and the right limiting piece 82 respectively abut against two lower top surfaces of the supporting plate 25. Two limiting plates 26 are provided on the front side surface of the supporting plate 25. A third spring (not shown) is provided between the fourth spring receiving groove 85 and the front side surface of the supporting plate 25. The rear end of the third spring (not shown) is located between the two limiting plates 26. The supporting platform 27 for supporting the rear end of the third spring (not shown) is provided between the two limiting plates 26. The hook groove 32 snap-fitted with the corresponding hook 84 is provided at the bottom of each of the front end and the rear end of the feeding chair 3.

Referring to FIGS. 7, 8, 9 and 14-17, when connecting the feeding chair 3 to the booster stool 2, the feeding chair 3 is placed on the top surface of the booster stool 2. Utilizing the weight of the feeding chair 3, the hook 84 is snap-fitted into the corresponding hook groove 32. Then, the buckle part 31 is buckled to the corresponding buckle groove 22 so that the feeding chair 3 is connected to the booster stool 2. When removing the feeding chair 3 from the booster stool 2, the buckle plate 21 is pulled outward to disengage the buckle part 31 from the buckle groove 22. Then, the pressing parts 8 at the front and rear ends of the booster stool 2 are pressed down to disengage the hooks 84 from the corresponding hook grooves.

Figure 2:
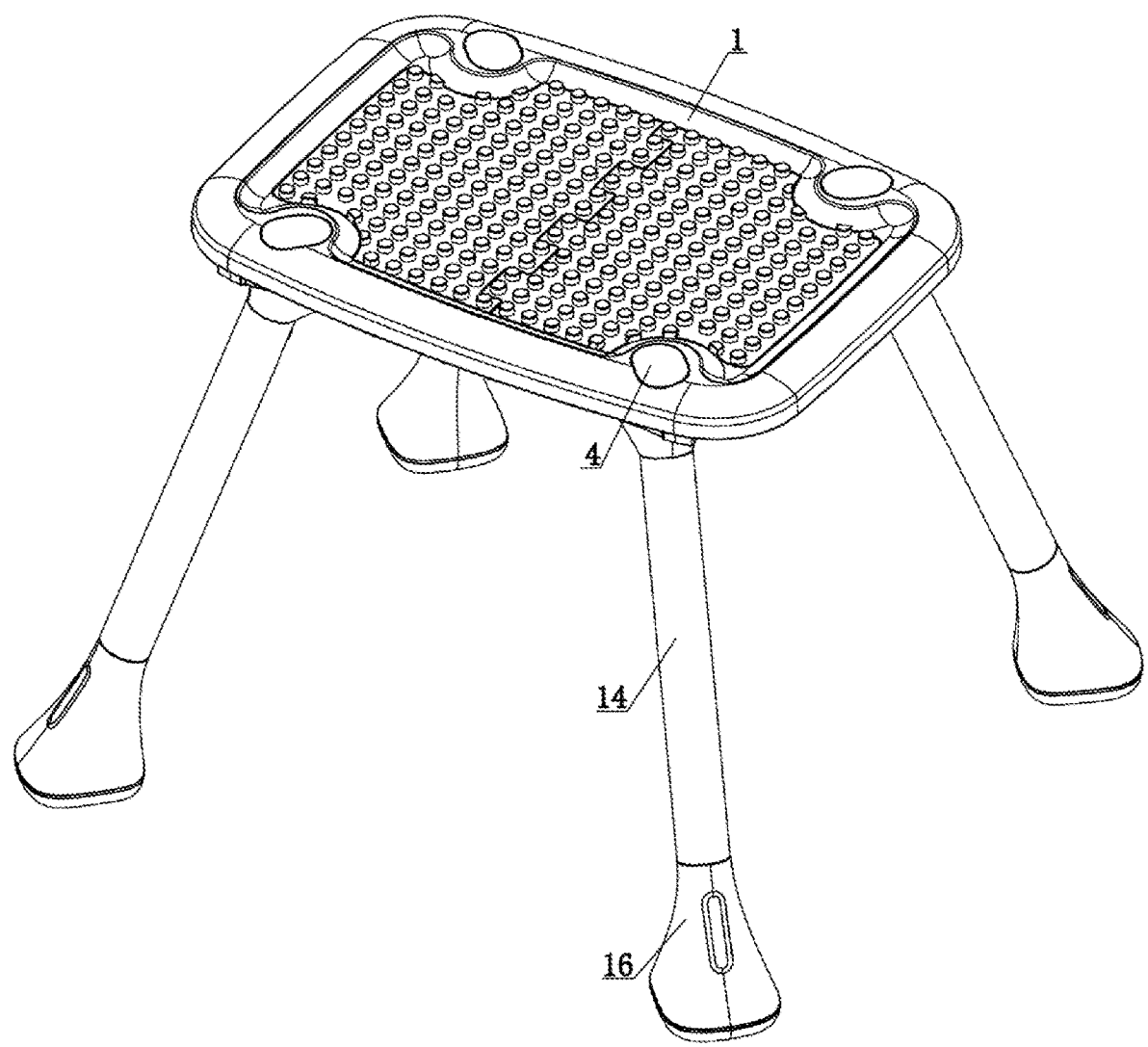
FIG. 2 is a structural diagram of a building block table according to the present invention.
Figure 3:
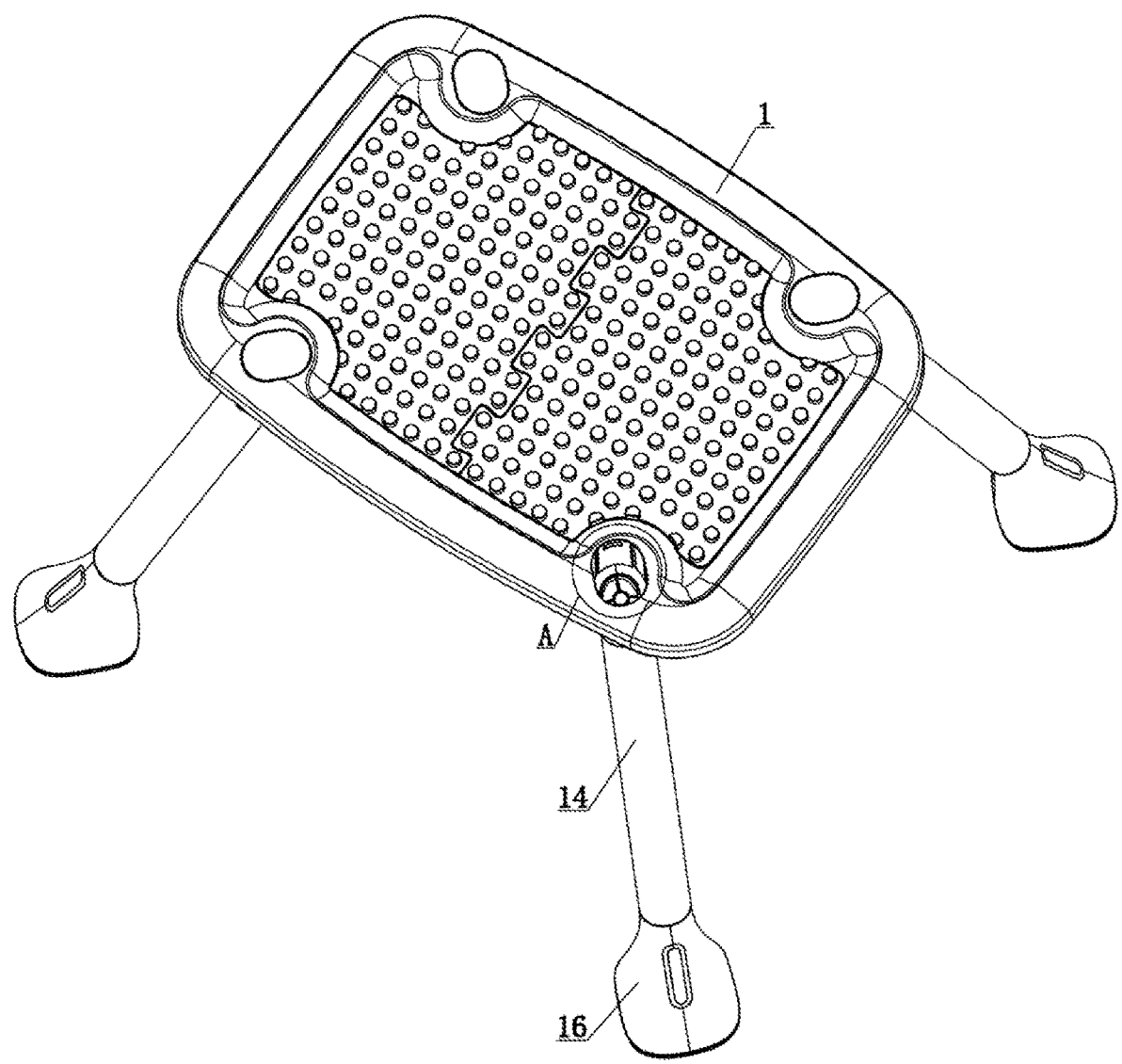
FIG. 3 is a structural diagram of the building block table with one cover removed according to the present invention.
Figure 4:
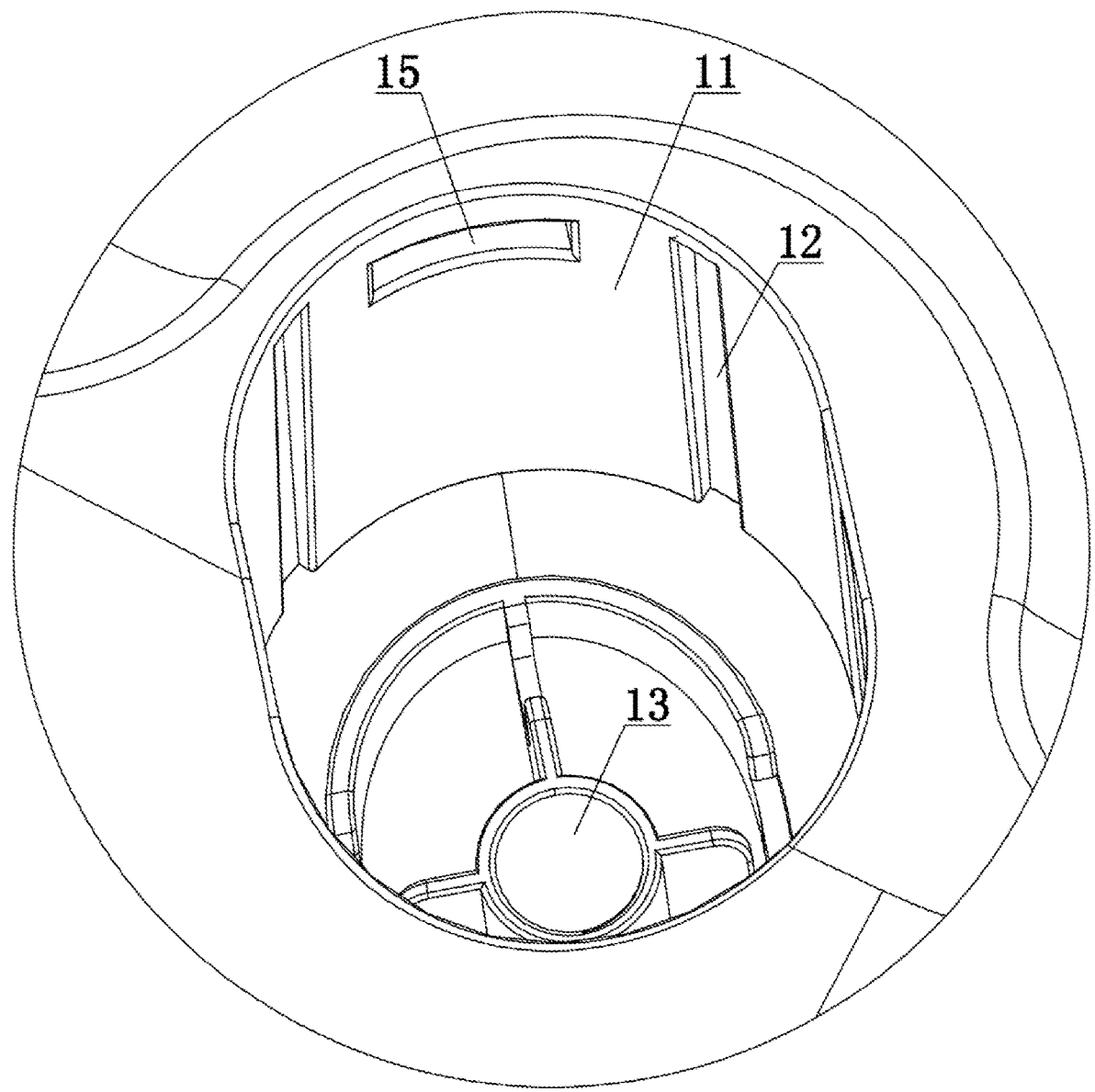
FIG. 4 is a partial enlarged view of the portion A encircled in FIG. 3.
Figure 5:
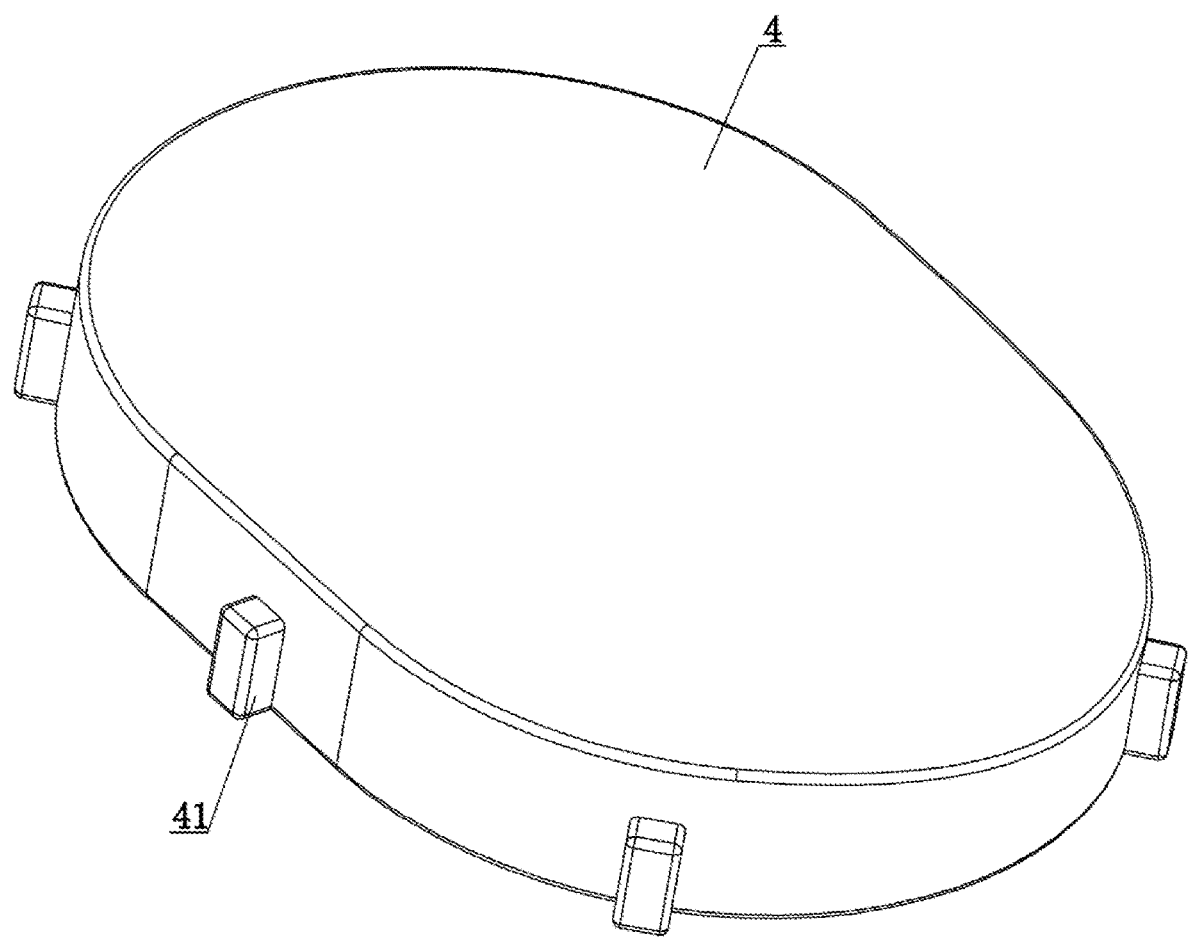
FIG. 5 is a structural diagram of the cover according to the present invention.
Figure 6:
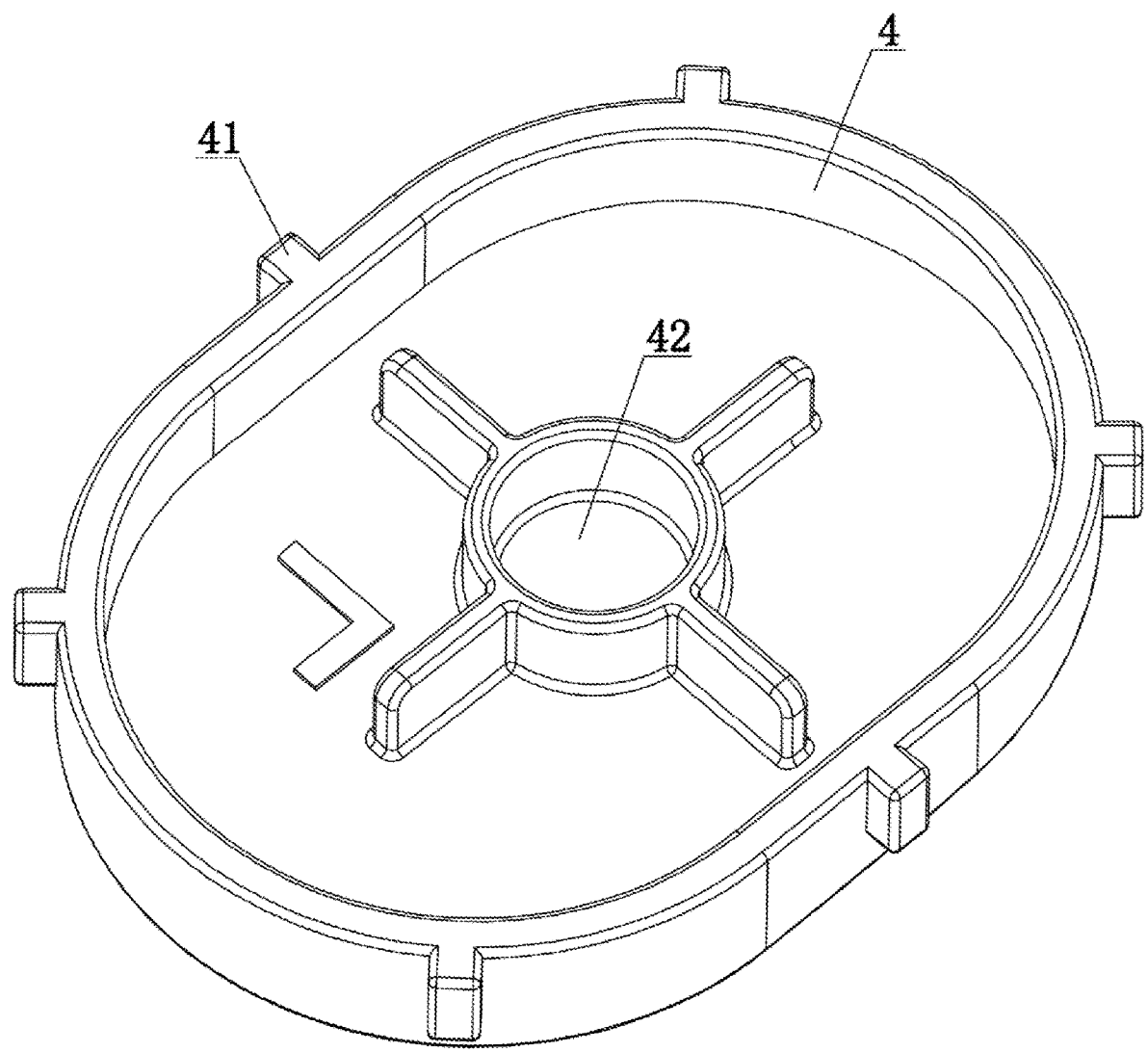
FIG. 6 is a structural diagram of the cover from another angle of view according to the present invention.
Figure 7:
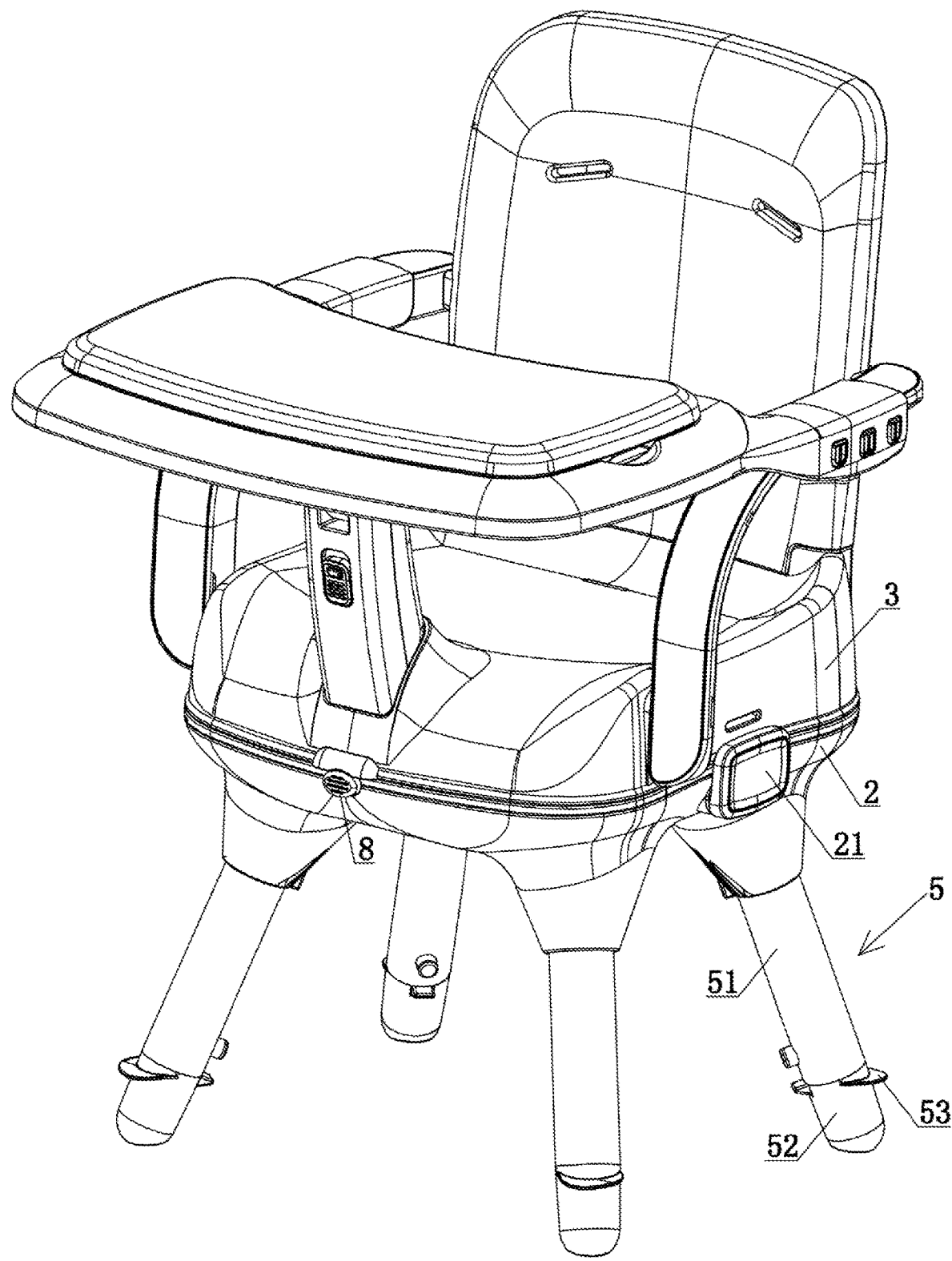
FIG. 7 is a structural diagram of the connection between a booster stool and a feeding chair according to the present invention.
Figure 8:
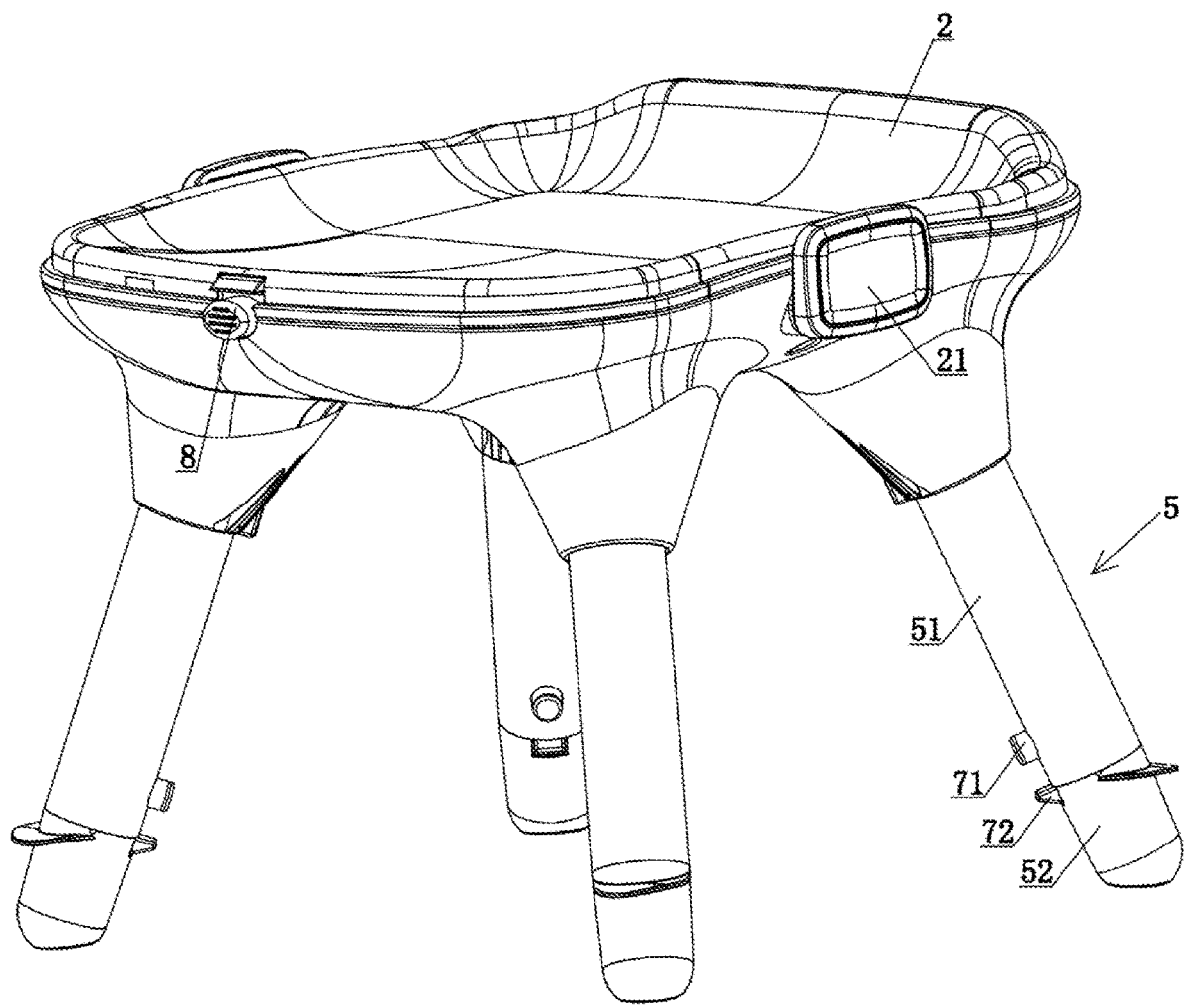
FIG. 8 is a structural diagram of the booster stool according to the present invention.
Figure 9:
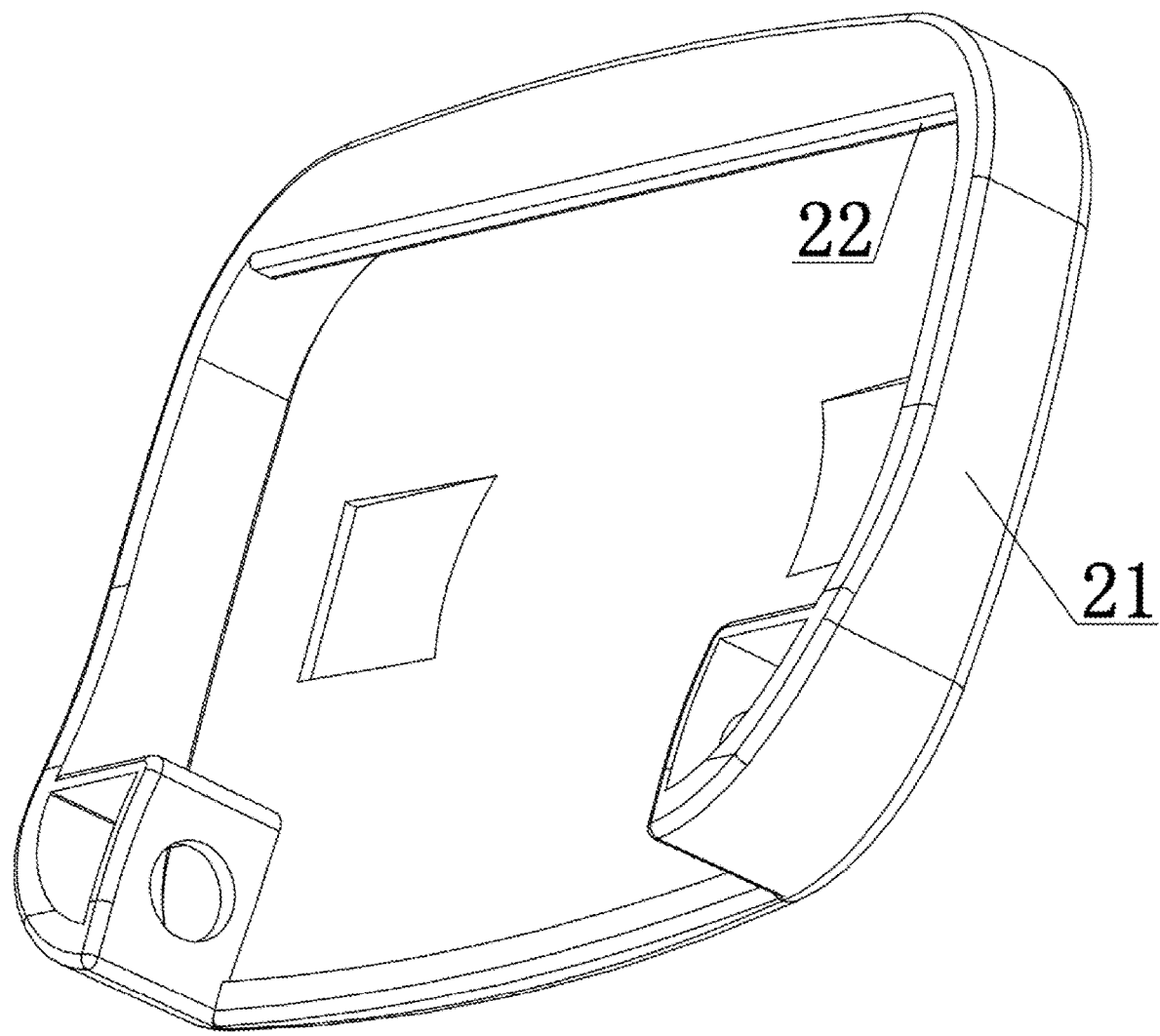
FIG. 9 is a structural diagram of a buckle plate according to the present invention.
Figure 10:
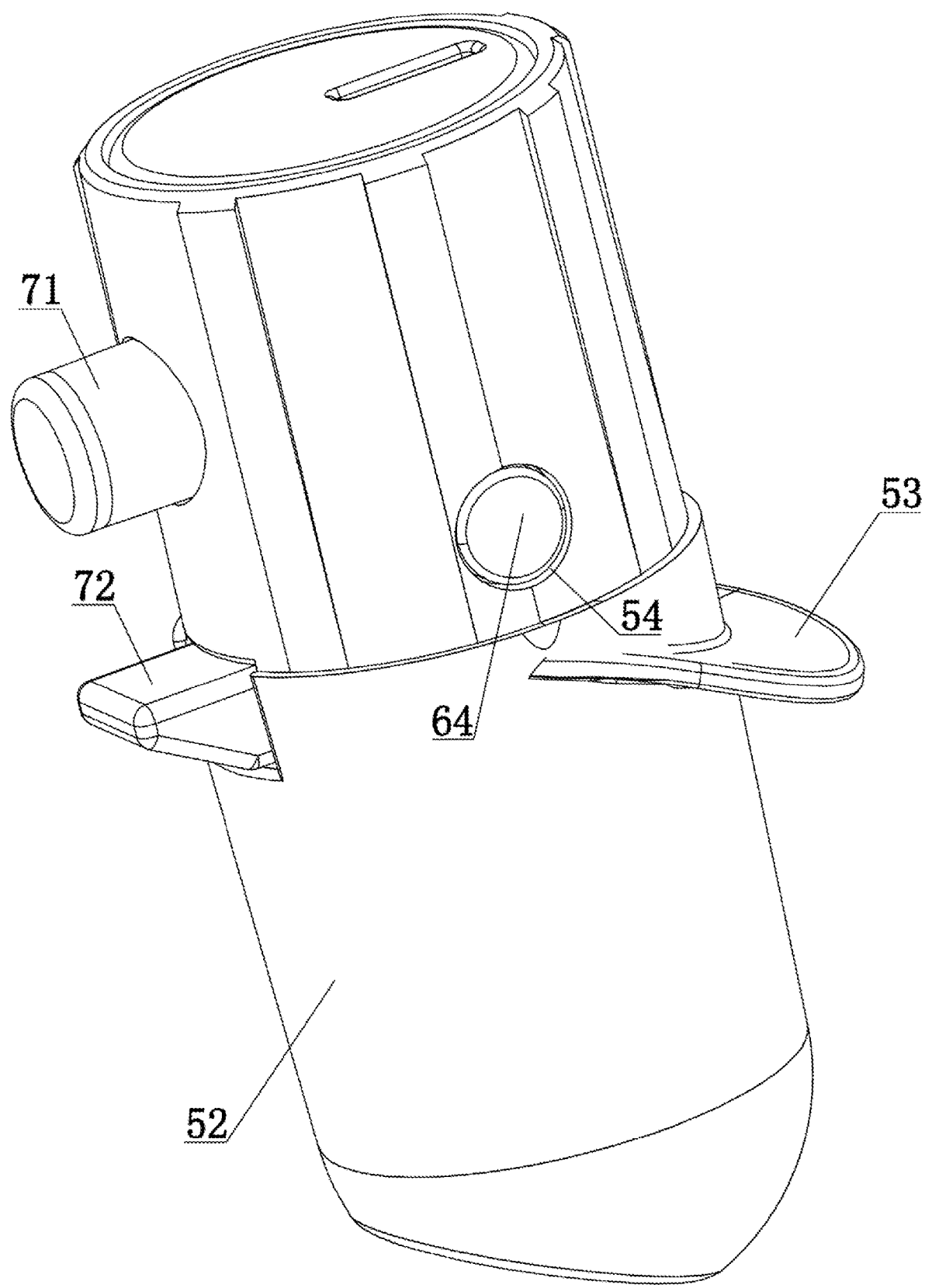
FIG. 10 is a structural diagram of an inserting rod according to the present invention.
Figure 11:
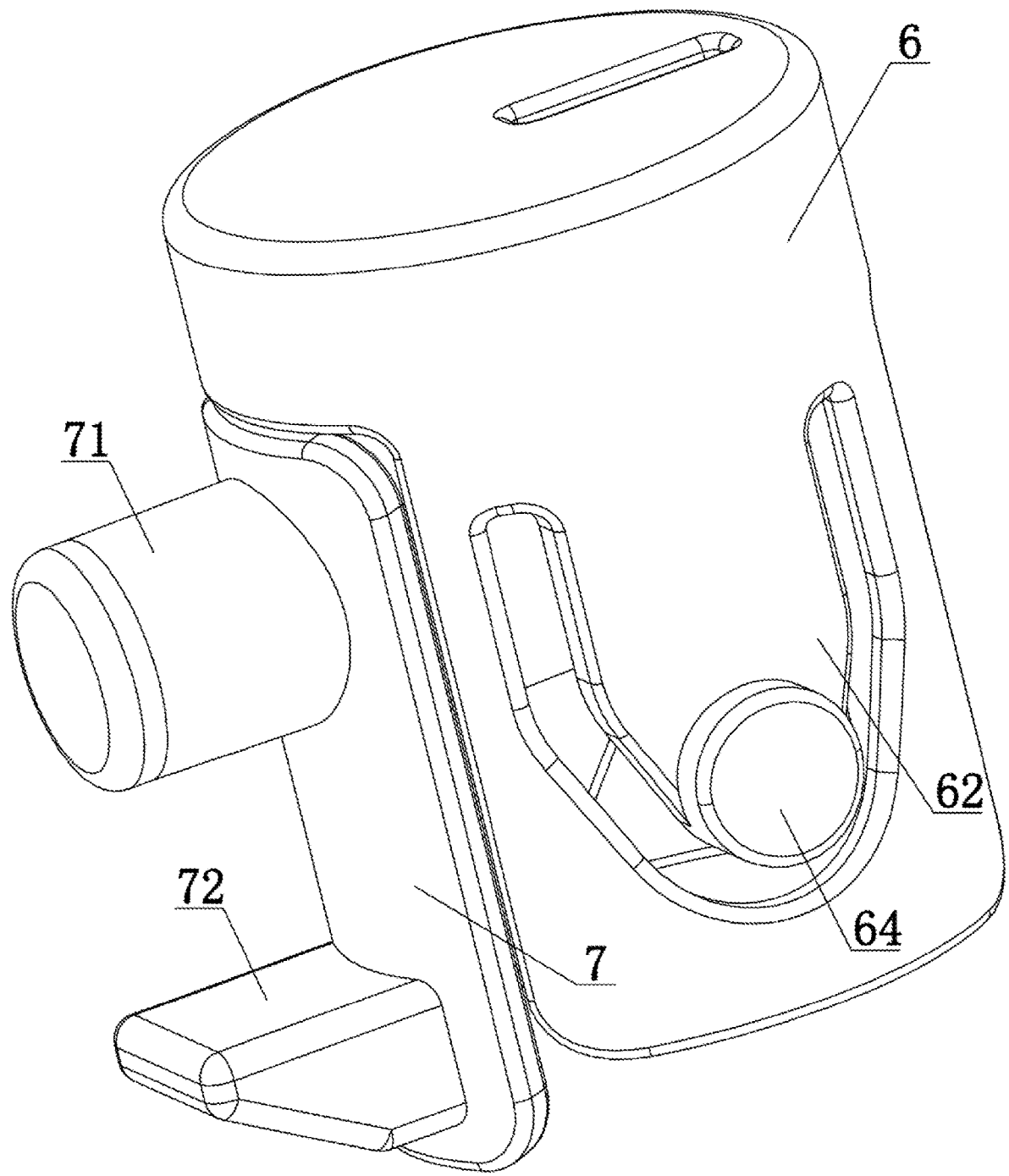
FIG. 11 is a structural diagram of a limiting member and a pressing member according to the present invention.
Figure 12:
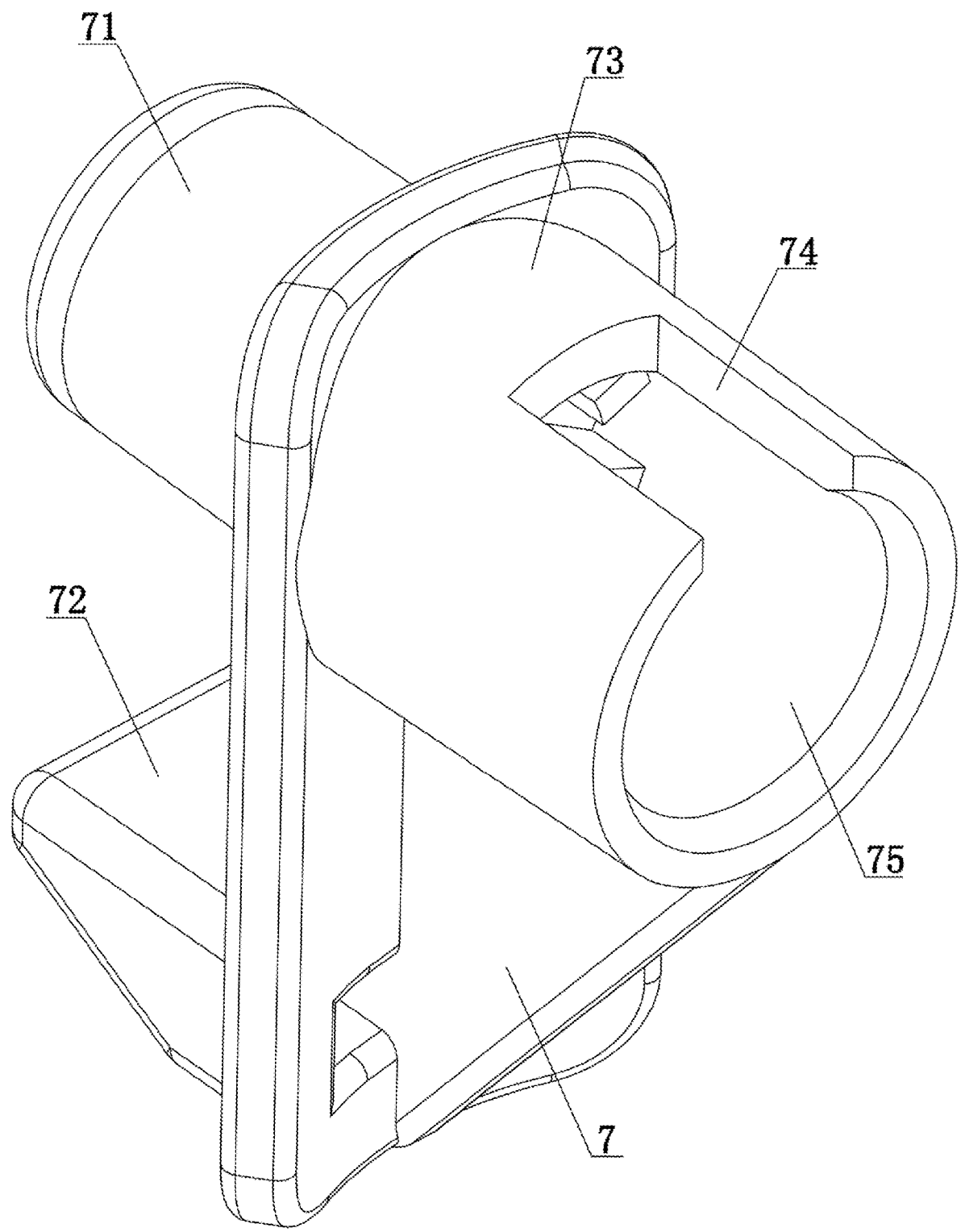
FIG. 12 is a structural diagram of the pressing member according to the present invention.
Figure 13:
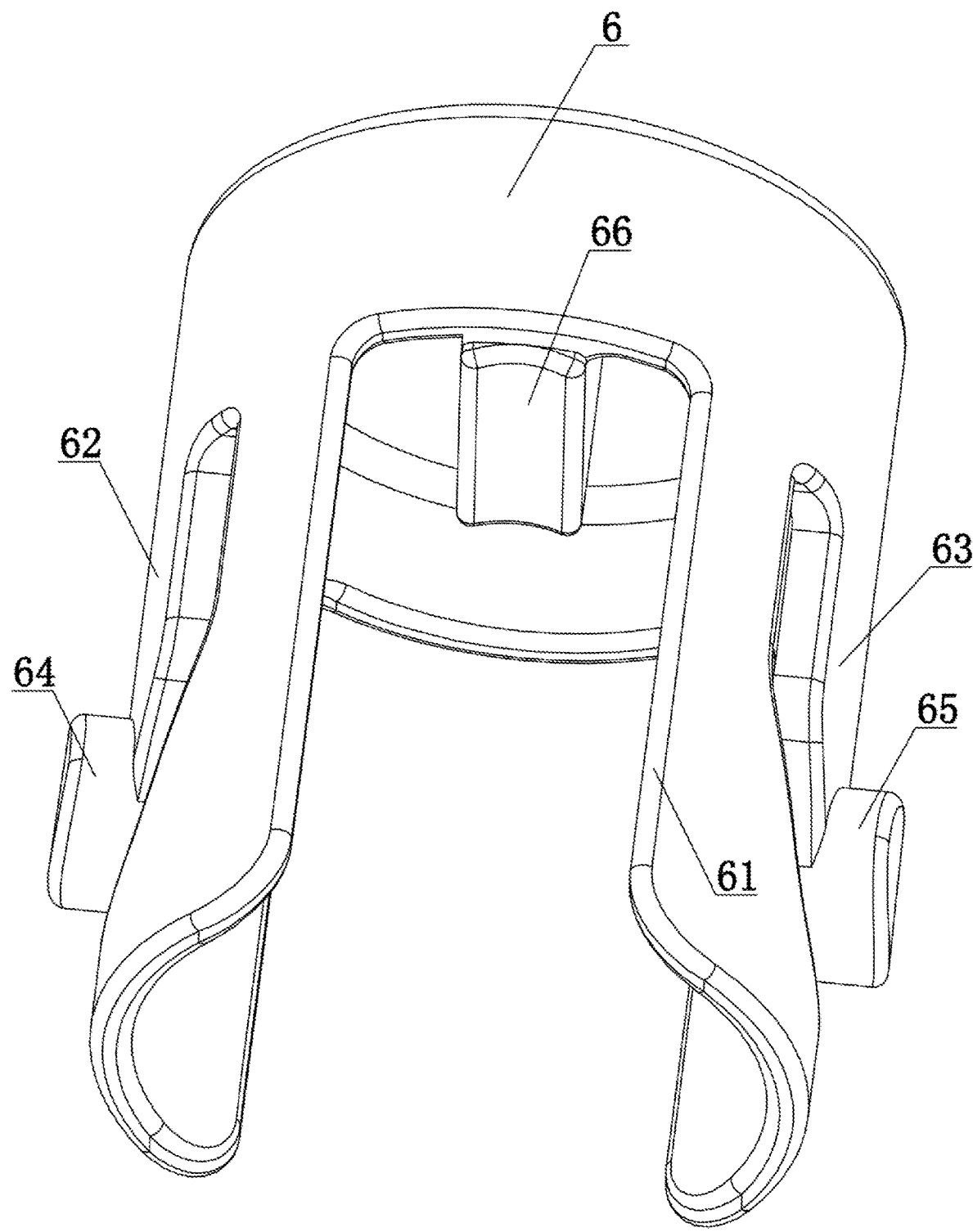
FIG. 13 is a structural diagram of the limiting member according to the present invention.
Figure 14:
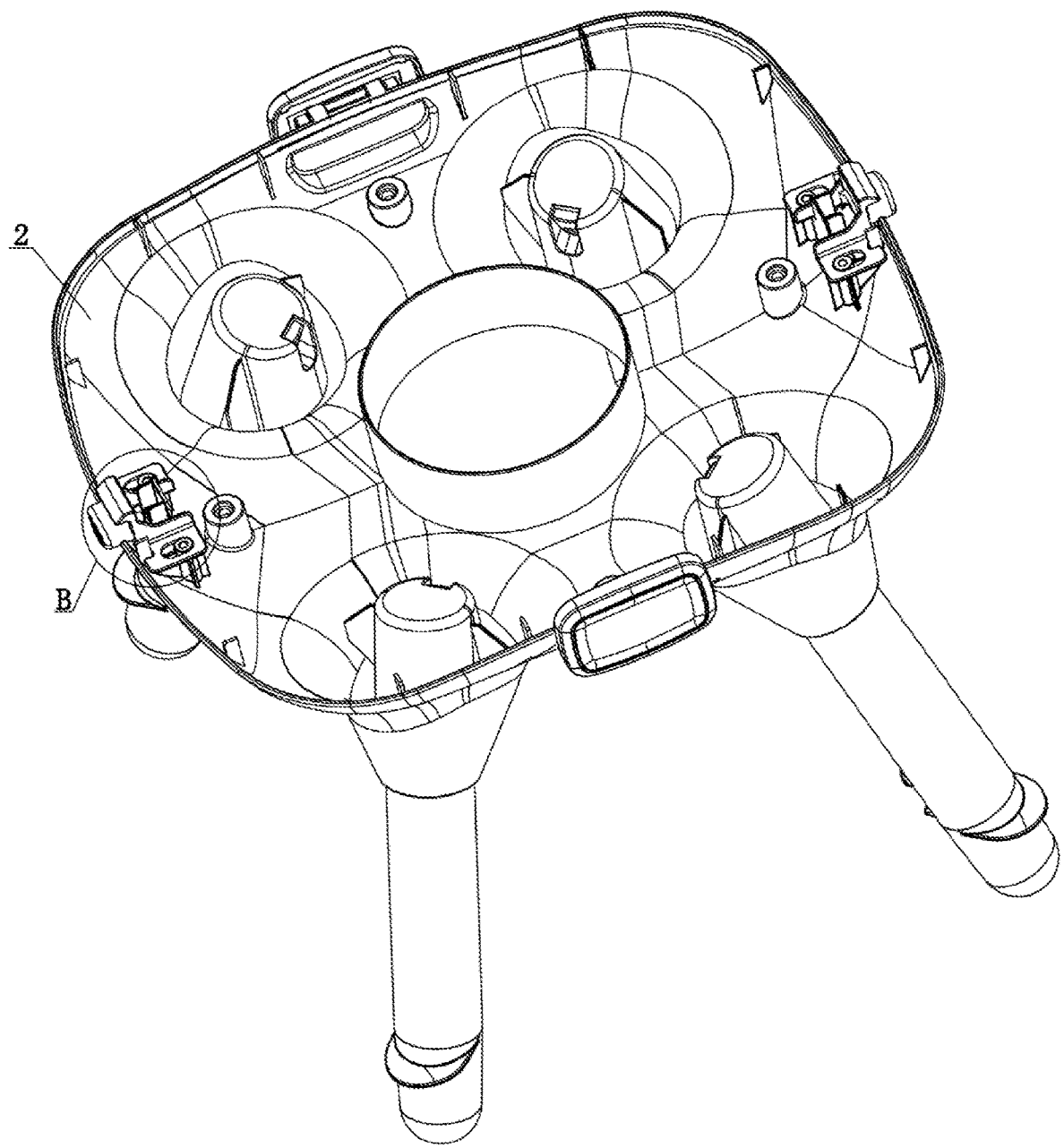
FIG. 14 is a structural diagram of the booster stool with the top removed according to the present invention.
Figure 15:
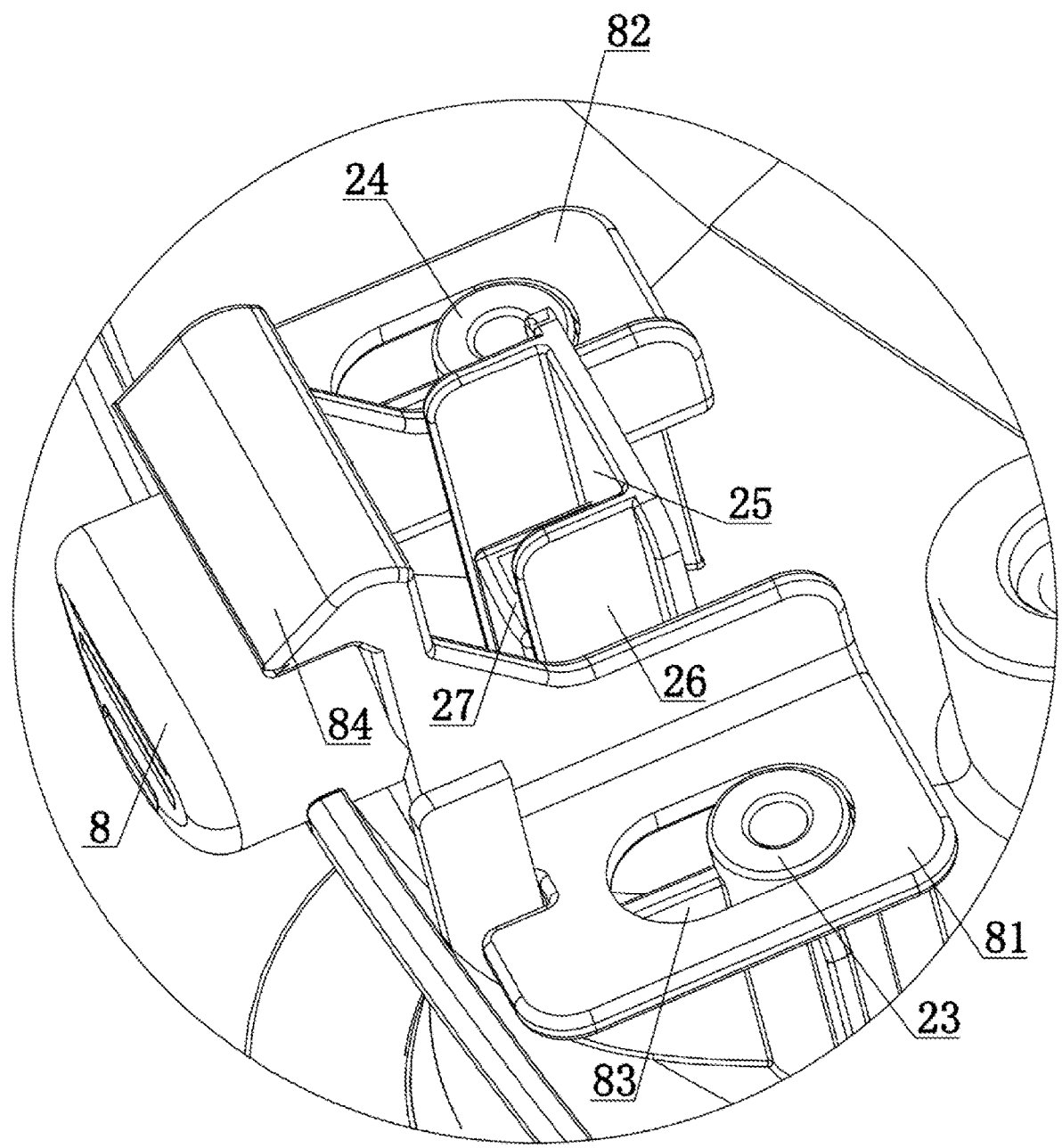
FIG. 15 is a partial enlarged view of the portion B encircled in FIG. 14.
Figure 16:
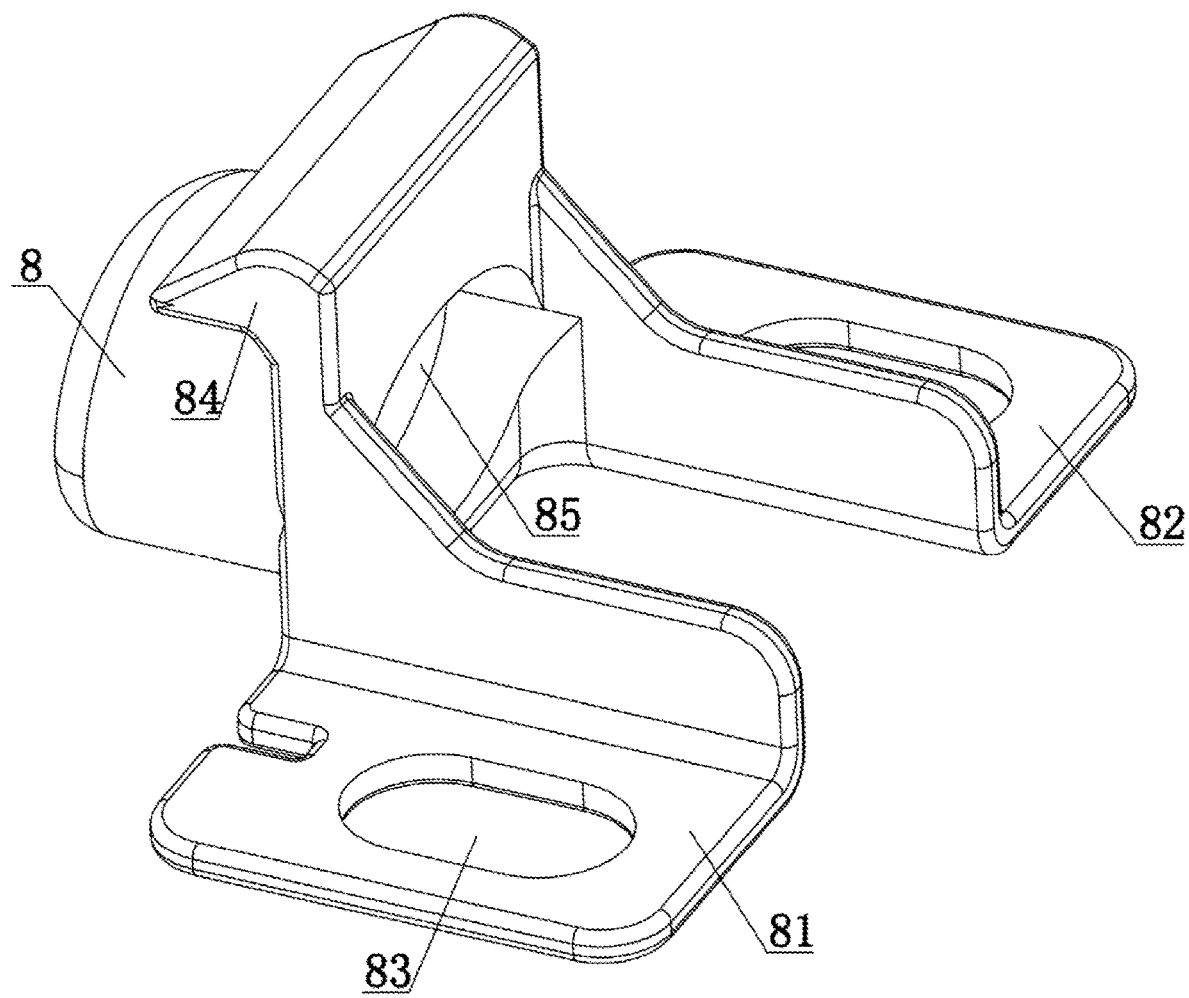
FIG. 16 is a structural diagram of a pressing part according to the present invention.
Figure 17:
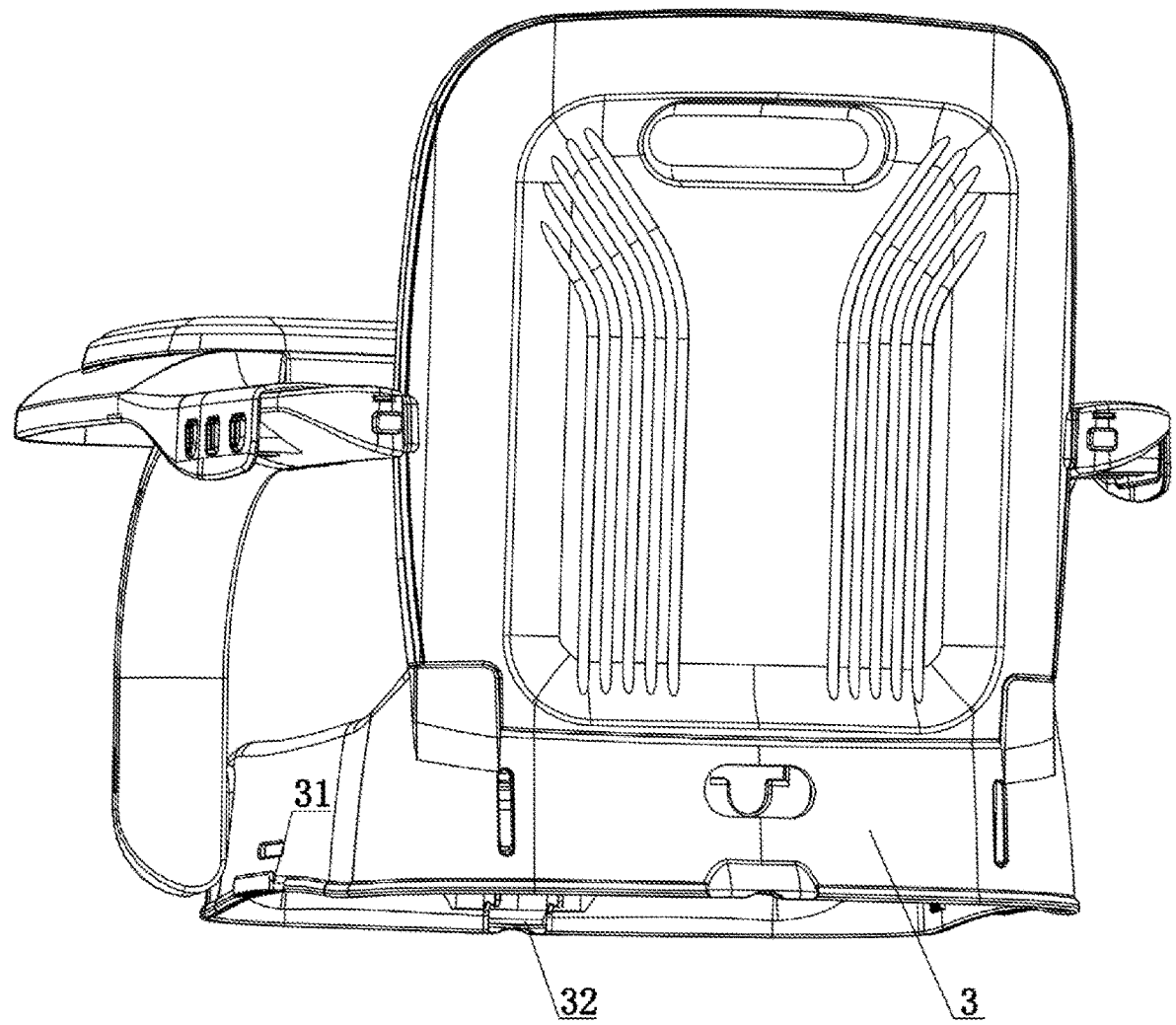
FIG. 17 is a structural diagram of the highchair according to the present invention.

Referring to FIG. 1 and FIG. 2, the supporting part 16 is provided on the bottom of each of the four legs 14, and the outer periphery of the supporting part 16 gradually increases from top to bottom. The design of the shape of the supporting part 16 increases the supporting area of the supporting part 16 so that the legs 14 can provide more stable support.

The above description is merely the specific implementations of the present invention, the design concept of the present invention is not limited thereto. Any non-substantive changes made to the present invention based on the concept of the present invention is an infringement of the scope of protection of the present invention.

What is claimed is:

1. A highchair, comprising a building block table, a booster stool, and a feeding chair; wherein
a bottom of the booster stool is detachably connected to a top of the building block table; a bottom of the feeding chair is detachably connected to a top of the booster stool;
four sockets are provided on a top surface of the building block table;
an elastic cover adapted to each socket of the four sockets covers a top of the each socket;
a plurality of vertical grooves are spaced apart on an inner periphery of the each socket;
a bottom surface of the each socket is provided with a first spring receiving groove;
a plurality of protruding blocks are spaced apart on an outer periphery of the elastic cover;
each protruding block of the plurality of protruding blocks is matched with a groove corresponding the each protruding block;
a bottom surface of the elastic cover is provided with a second spring receiving groove;
a first spring is provided between the first spring receiving groove and the second spring receiving groove;
the building block table has four legs, wherein the four sockets separately extend into upper parts of the four legs corresponding to the four sockets; and
the booster stool has four legs, wherein bottoms of the four legs of the booster stool are inserted into the four sockets corresponding to the four legs of the booster stool.

2. The highchair according to claim 1, wherein
each leg of the four legs of the booster stool comprises a leg rod and an inserting rod, wherein
a top of the inserting rod is inserted into a bottom of the leg rod;
an abutting plate is provided in a middle of the inserting rod;
the inserting rod has a hollow structure;
a limiting member is provided inside the top of the inserting rod;
a bottom of the limiting member is provided with an opening;
a left elastic piece is provided on a left side of the limiting member and a right elastic piece is provided on a right side of the limiting member;
a left side surface of the left elastic piece is provided with a left clamping column, and a right side surface of the right elastic piece is provided with a right clamping column;

the inserting rod is provided with two clamping holes engaged with the left clamping column and the right clamping column, respectively;

a pressing member is provided inside the inserting rod, and a width of the pressing member is equivalent to a width of the opening;

a rear side surface of the pressing member is provided with a pressing column and a clamping part, wherein the pressing column and the clamping part are arranged from top to bottom;

a front side surface of the pressing member is provided with a receiving column;

a top surface of the receiving column is provided with a limiting slot;

a third spring receiving groove is provided in the receiving column;

a limiting part is provided on a top surface of the opening of the limiting member;

the limiting part is located in the limiting slot;

a second spring is provided between the third spring receiving groove and an inner side wall of the inserting rod;

one end of the pressing column passes through the inserting rod and the leg rod in sequence and is located outside the leg rod;

a clamping slot is provided in the each socket; and the clamping part passes through the inserting rod and is engaged in the clamping slot.

3. The highchair according to claim 1, wherein a left side surface and a right side surface of the booster stool are each provided with a buckle plate;

a bottom of the buckle plate is hinged to the booster stool;

a buckle groove is provided on a top of an inner side of the buckle plate;

a buckle part configured to be buckled into the buckle groove is provided on a bottom of each of a left side and a right side of the feeding chair;

a pressing part is provided in a middle of each of a front end and a rear end of the booster stool;

a rear end of the pressing part is provided with a left limiting piece and a right limiting piece;

each of the left limiting piece and the right limiting piece is provided with a strip groove;

a left positioning column corresponding to the left limiting piece and a right positioning column corresponding to the right limiting piece are provided inside the booster stool;

a top of the left positioning column and a top of the right positioning column are located in the strip grooves corresponding to the left positioning column and the right positioning column;

a hook is provided on a top of the pressing part;

the rear end of the pressing part is provided with a fourth spring receiving groove;

a protruding supporting plate is provided inside the booster stool;

a bottom surface of the left limiting piece and a bottom surface of the right limiting piece respectively abut against two lower top surfaces of the protruding supporting plate;

two limiting plates are provided on a front side surface of the protruding supporting plate;

a third spring is provided between the fourth spring receiving groove and the front side surface of the protruding supporting plate;

a rear end of the third spring is located between the two limiting plates;

a supporting platform for supporting the rear end of the third spring is provided between the two limiting plates;

a hook groove snap-fitted with the hook corresponding to the hook groove is provided at a bottom of each of a front end and a rear end of the feeding chair.

4. The highchair according to claim 1, wherein a supporting part is provided on a bottom of each of the four legs of the building block table, and an outer periphery of the supporting part gradually increases from top to bottom.

\* \* \* \* \*